June 9, 1964

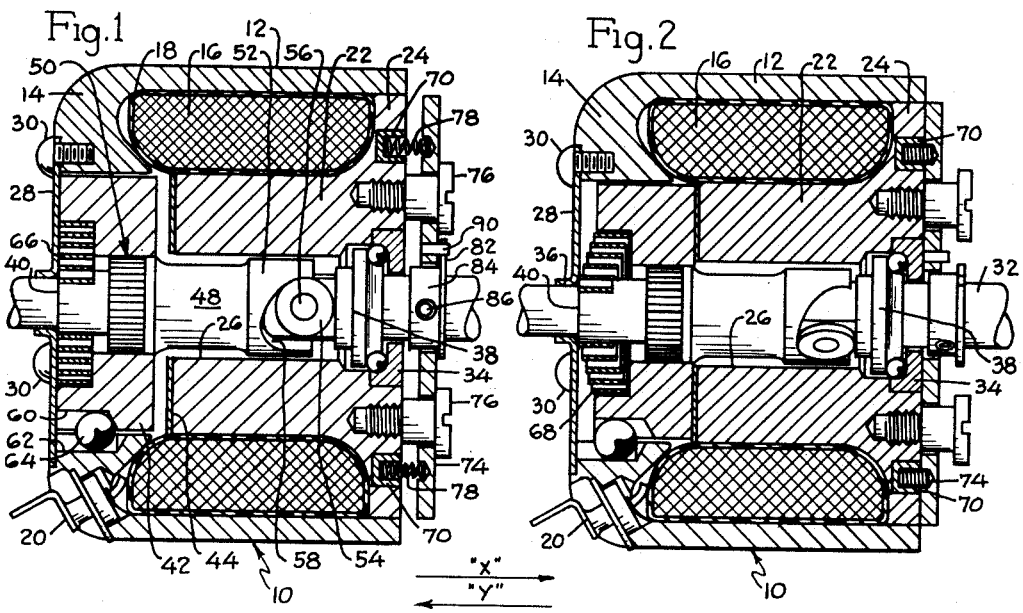

J. E. STRAUB 3,136,930

ROTARY SOLENOID

Filed Sept. 12, 1960

INVENTOR.
Joseph E. Straub
BY

United States Patent Office 3,136,930
Patented June 9, 1964

3,136,930
ROTARY SOLENOID
Joseph E. Straub, Manhattan Beach, Calif., assignor to Illinois Tool Works, Inc., a corporation of Delaware
Filed Sept. 12, 1960, Ser. No. 55,217
9 Claims. (Cl. 317—192)

This invention relates to an electro-magnetically operated rotary actuator, and more particularly, to a solenoid whose output shaft is designed to provide rotary motion rather than linear motion. Such a solenoid is an improved torque solenoid of the type shown and described in my co-pending application, Serial No. 532,681, now Patent No. 2,989,871, filed September 6, 1955.

Basically such a device consists of an electro-magnet and an axial movable armature which is adapted to move linearly upon energization of the electro-magnet. Such a linear movement is not always desired. In many instances, the actuator is of little value unless it provides a rotary movement capable of actuating a switch or similar device. A simple, compact operator is highly desirable in such instances and one which rotates the shaft is referred to in this material as a torque solenoid.

While there are some such solenoids presently available, in general these solenoids are capable of being influenced by external forces, i.e., the influence of gravity during periods of high rates of acceleration of relatively long duration. By this it is meant that the armature of the solenoid can be induced to move and thereby actuate the shaft member which supplies the rotary motion when the solenoid as a whole is subjected to these acceleration forces. Such forces are predominately found in aircraft and space vehicles, two areas in which rotary solenoids find a ready use. In both of these instances this undesired actuation of the solenoid can be catastrophic when the solenoid is utilized to activate a member and such member is activated at an inopportune moment in the programing cycle.

It is, therefore, a major object of this invention to provide an improved torque solenoid which has controlled actuation.

A more specific object of this invention is to provide a torque solenoid which cannot be actuated by acceleration forces.

A further object of the invention is the provision of an improved torque solenoid which is only actuatable by means of a controlled source of electrical energy, even when the solenoid is subjected to external forces of acceleration of a high rate and a relatively long duration.

Still another object of this invention is to provide a torque solenoid whose output torque may be maintained substantially constant throughout the entire range of movement of the shaft, or may be varied as required.

It is a further object of the invention to provide a torque solenoid of simple construction which can be easily fabricated and which is conducive to a design, which, by a substantially total enclosure minimizes the effects of external conditions, such as dust, etc., and which, because of a minimum of moving parts is capable of giving long, trouble-free service.

These and other objects of this invention will become apparent to those skilled in the art from the following description of embodiments of this invention and from the drawings illustrating those embodiments in which:

FIG. 1 is an elevation in partial section of one embodiment of this invention shown in its initial position of rest;

FIG. 2 is an elevation in partial section of the embodiment shown in FIG. 1 after the device has been energized;

FIG. 3 is an elevation in partial section of a second embodiment of the present invention shown in its initial position of rest;

FIG. 4 is a similar elevation in partial section of the embodiment shown in FIG. 3 when the elements of said embodiment are subjected to a particular direction of acceleration force;

Figure 5:
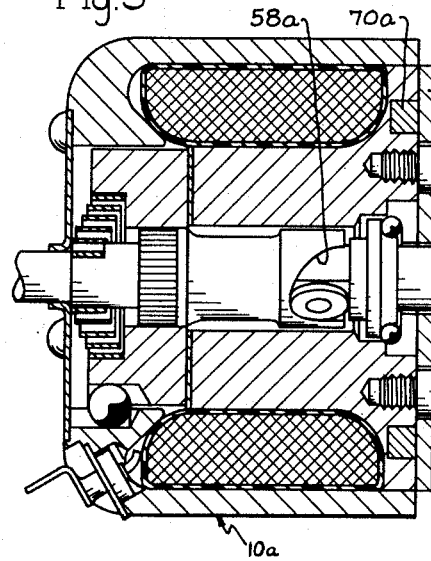
FIG. 5 is an elevation in partial section of the embodiment in FIG. 3 showing the elements in their positions when the device has been energized.

Referring now more specifically to the drawing wherein like parts are designated by the same numerals throughout the various figures, the torque solenoid 10, as seen in FIGS. 1 and 2, includes a substantially cylindrical housing or shell 12. The shell 12 is of a magnetic material such as soft iron, and it is provided at one end with an inwardly directed flange or stator ring 14 for purposes best shown hereinafter. Located within the shell 12 is a helical coil of wire 16, wrapped in suitable insulation 18 and having leads 20, only one of which is shown, by means of which an electrical circuit may be completed through the coil to energize same.

Coaxial with the coil 16 and the shell 12 is a fixed core 22 of magnetic material that fits within the coil and is flared at one end with a flange 24 which is adapted to engage the inside of the shell 12 so that a path of low, magnetic reluctance is provided for the flux generated by the coil. Core 22 is provided with a through bore 26 which is coaxial with the axis of the shell 12. It will be noted that the fixed magnetic core 22 does not extend completely through the shell 12, but instead extends only part way.

At the opposite end of the shell 12, the inwardly directed flange or stator ring 14 is flared at its inner radial extent towards the fixed core 24 so as to substantially complete the closure and encasement of the major portion of the coil 20. This flange 14 of the shell 12 is preferably integral, but if desired, may be made as a separate part and suitably attached thereto. A cover or end plate 28, preferably of a non-magnetic material and hereinafter described in greater detail, extends across the opening or aperture in flange 14 and is screwed or otherwise suitably held to the flange 14 as by screws 30.

An output shaft 32 made of non-magnetic material is co-axially located with respect to the shell 12 and projects outwardly from either end of the shell. Shaft 32 is supported at one end by a bearing 34 mounted in the fixed magnetic core 22. The shaft 32 passes through bore 26 of the core 22 and is supported at the other end of the shell 12 by a bearing means, such as provided by journaling it in the aperture 36 in the end plate 28. A shoulder 38 is formed on the shaft 32 to bear against one portion of the bearing 34, this bearing being adapted to take both radially and axially directed loads. The opposite end of the shaft 32 is provided with a reduction in diameter as at 40, thus providing a shoulder which bears against the inside of end plate 28 whereby shaft 32 is prevented from axial movement within the shell 12 but is permitted to freely rotate.

Between the inner end of the fixed magnetic core 22 and the end plate 28 is an annular space extending between the shaft 32 and the inner surface of flange 14.

This space has a diameter slightly less than the inner diameter of the coil 16. An armature 42 having a diameter substantially equal to the inner surface diameter of flange 14 is positioned in this annular space. The axial length of armature 42 is substantially less than the distance between the inner end of the fixed magnetic core 22 and the end plate 28. Thus, axial movement of the armature 42 is possible when the coil 20 is energized and de-energized. By suitable means, such as a non-magnetic shim or spacer 44, the armature 42 is maintained at spaced relation from the core 24 at all times so that a magnetic gap exists between these members.

A tubular member 48 surrounds the output shaft 32 and is freely slideable thereon. At one end the tubular member is rigidly connected to the armature 42 so that neither axial nor rotational movement of the tubular member relative to the armature 42 is possible. This may be accomplished by a press fit and a knurled section as indicated at 50. Other suitable means for associating these members can also be utilized. Tubular member 48 is fabricated so as to provide a high reluctance to magnetic lines of force. This can be accomplished through the proper choice of a particular shape, suitable materials or both.

The opposite end of the tubular member 48 is provided with a cam section 52 that cooperates with a pair of rollers 54 mounted transversely upon the output shaft 32. The shaft 32 is preferably flat on diametrically opposite sides adjacent the shoulder 38 which bears on bearing 34, and suitable means, such as a pin 56, holds the rollers 54 for rotation about an axis normal to the axis of the shaft 32. The cam 52 is of the crown type in which a cut of varying axial depth forms a cam surface 58 upon which the rollers 54 and 56 acting as cam followers ride. The shape of the cam surface 58 is such that upon axial movement of the armature and associated tubular member 48, the rollers 54 riding on cam surface 58 will impart a rotary movement shaft 16. While it is possible to give the cam surface 58 a uniform slope, so that equal incremental movement of the armature cause equal incremental angular movements of the shaft 16 in all positions of the armature, this is generally not desirable. Thus, at the beginning of the armature stroke, the force that is developed by the armature is less than that which is developed just before the end of its inward movement. Secondly, it is generally desirable to so shape the cam surface 58 as to compensate for this inequality of force. Thus, the cam surface is comparatively steep near the start of the stroke and shallow near the end of the stroke, thereby developing a substantially uniform torque over the entire movement of the shaft if this is desired. Conversely, the torque can be varied by variations in the design of the cam surface.

It is highly desirable in devices of this character, to keep the reluctance of the magnetic circuit at an absolute minimum and to eliminate all air gaps, or at the best, reduce them to a minimum. Thus, the juncture between the shell 12 and the core 22 is substantially negligible by manufacturing the core 22 for a press fit within the shell 12 in the area of its flange 24. The gap between the armature 42 and the inner surface of the flange 14 must be kept as small as possible. The cheapest and most feasible method for accomplishing the matter is by maintaining a minimum clearance between the armature 42 and the flange 14 and then applying a dry surface lubricant, such as molybdenum disulfide or other suitable lubricating material, on the two adjacent surfaces.

For the proper operation of this device, it is imperative that the armature 42 be held against rotation during its linear movement in the energization cycle. This is accomplished by providing one or more slots 60 in the armature 42 and an equal number of complementary but opposing slots 62 in the flange 14. A ball bearing 64 rides within each of the opposed slots 60 and 62 respectively and permits the linear movement of the armature 42 but prevents any rotational movement thereof. Other means can also be utilized, as shown in my co-pending application, such as pins. As has been briefly explained heretofore, in the operation of a device of this type the energization of the coil 16 results in a linear movement of the armature to the right as viewed in FIGS. 1 and 2. This linear movement is converted to a rotary motion by the action of the cam 52 on the roller 54. As is common in most rotary solenoids, the shaft is returned to its initial position upon de-energization. Similarly, the armature must be moved linearly back to its initial position to accomplish a re-cycling. The means which is utilized to accomplish this is a spring 66 made of flat strip stock and wound in a helical coil. The spring 66 is positioned within a recess 68 formed in one end of the armature 42 and securely fastened thereto. The inner end is secured to a flat on the shaft 32. Thus, spring 66 returns the armature 42 linearly to its initial position while at the same time rotating shaft 32 back to its initial position upon de-energization of the coil 16.

The description of this device, heretofore, covers the art that is known and which is disclosed in my co-pending application hereinabove set forth. It will be noted that it was stated heretofore that the reluctance of the material forming shell 12 and core 22 must be held to a minimum to permit a ready passage of the flux induced by the coil 16. In the present invention a restriction 70 is placed in the magnetic path through the flange 24. The restriction 70 can take the form of a series of plugs or an annular member disposed within complementary bore means within the flange 24. The restriction 70 is formed of a non-magnetic material, either metallic or dielectric in nature. The purpose of this restriction will be set forth more fully hereinafter.

At the same end of the torque solenoid, there is mounted a disc 74 of magnetic material which is supported by shoulder studs 76, said studs 76 being telescopically associated with tapped holes in the flange 24. The disc 74 is normally spaced away from the end face of flange 24 by means of compression springs 78. An arm 82 is rigidly attached to the shaft 32 by means of a collar 84 and set screw 86. A sear 90 is attached to disc 74 and so located that it cooperates with arm 82 in preventing rotation of the shaft 32 when the solenoid is in its de-energized state and the disc 74 is maintained in its normal spaced relation to flange 24 by its springs 78. Thus, shaft 32 can only rotate when disc 74 and its associated coupler means is magnetically or mechanically moved a certain distance towards the solenoid body.

In the operation of this particular device, when electrical energy is applied to coil 16 to lead 20 the magnetic flux will create a field around the restriction 70 and cause disc 74 to move to the left against the restraint of springs 78 to the position shown in FIG. 2, thereby closing the air gap normally present. Plate 74 will then pass the magnetic flux around the restriction 70 and the solenoid will operate in a normal manner by the armature 42 moving to the right, as viewed in the drawings, and with its associated tubular member 48 and attached cam 52 inducing a rotary movement in the output shaft 32. When the electrical energy is removed and the solenoid is de-energized, the disc 74 will tend to spring back to the right to the position seen in FIG. 1, while the armature and output shaft return to the initial position. Arm 82 or sear 90 may be tapered to allow a ratcheting action when the shaft 32 is resetting.

When the solenoid is accelerated in the direction of the arrow "x", disc 74 will move to the left to disengage the locking device formed by the arm 82 and shear 90. The solenoid, however, will not inadvertently rotate because the armature 42 will similarly be thrust to the left against the end plate 28. Shock loading by acceleration forces in the direction of the arrow "y" will cause the armature 42 to move to the right, as seen in the drawings, to exert a force in a direction that would normally cause the shaft 32 to rotate. In this instance, however, disc 74 will remain more firmly in position since it too is being thrown to the right and the interengagement of arm 82 and sear 90 will lock the shaft 32 and prevent the armature and its associated cam member 52 from inducing rotation of said shaft 32. It should be noted that when the solenoid is under the influence of acceleration forces either in the direction of the arrows "x" or "y" it can still be electrically actuated by providing energy through the leads 20 since the unit is designed that upon energization it will automatically assume the position shown in FIG. 2 regardless of the external forces to which it is being submitted. Similarly, this type of torque solenoid cannot be inadvertently activated by forces acting in a radial direction.

Referring now to FIGS. 3, 4 and 5 wherein a second embodiment of the invention is disclosed and wherein similar parts are indicated by similar numerals with the addition of the suffix "a". In this device the basic solenoid is essentially the same as in the first embodiment disclosed wherein there is provided a shell 12a, a coil 16a, a core 22a, an output shaft 32a, an armature 42a carrying a tubular member 48a having the cam 52a at one end. This embodiment similarly provides a restriction 70a in the flange 24a and has a disc 74a which is mounted on shoulder studs 76a. In this embodiment, however, the plate 74a is normally positioned adjacent to and in juxtaposition with the end of flange 24a by means of spring washers 94 interposed between the heads of shoulder screws 76a and the outer surface of the disc 74a. Since the magnetic path is normally complete, no movement of disc 74a will take place when voltage is applied to coil 16a.

As can be best seen in FIG. 4, the bearing 34a which supports the output shaft 32a at its right hand end, as viewed in the drawings of the present embodiment, is attached by suitable means to the disc 74a, forming the coupler means of this embodiment as is set forth hereinafter. This is contra to the first embodiment where the bearing 34 was secured to the core 22a. Thus, it can be seen that when the coil 16a is energized, the disc 74a will be held with such force that bearing race 34 will be held in the position shown in FIG. 5, and is sufficient to axially retain the output shaft 32 in its proper position during energization of the solenoid.

When the solenoid is subjected to acceleration forces in the plane of the arrow "x," all components will remain in their normal position during acceleration as shown in FIG. 3. In this position they are of course amenable to immediate operation by energization of the coil 16a.

When the solenoid is subjected to acceleration forces in the plane of the arrow "y," the components will assume the position shown in FIG. 4. In short, disc 74a moves to the right, as viewed in FIG. 4 of the drawings, compressing springs 94 and permitting the bearing race 34a to yield to the axial thrust of the shaft 32a. Armature 42a and associated cam 52a are also thrust to the right closing the air gap between the armature 42a and core 22a. The rollers 54a are moved with shaft 32a an equivalent distance to that moved by the cam 52a and hence no rotation of the shaft 32a will occur. When a voltage is placed on the coil 16a, the solenoid will automatically assume the position shown in FIG. 5 by virtue of the disc 74a being drawn inwardly toward the solenoid body to close the gap created by the restrictions 70a. If the solenoid is under the influence of acceleration forces in the direction of the arrow "y" during energization, the force of magnetic flux will retain the armature in its energized position and will move the disc 74a with its associated bearing race 34a to the left. This also moves the shaft 32a to the left and contact with the cam surface 58a and hence induces rotation of the shaft 32a. It should be noted that the air gap between the disc 74a and the outer surface of flange 24a is substantially equal to the normal deenergized air gap between the armature 42a and the core 22a.

A third embodiment of the present invention is disclosed in FIGS. 6 through 9 wherein similar parts are designated by similar numerals with the addition of the suffix "b." In this embodiment the operation of the solenoid is similar except that a double armature is utilized in place of the armature and core combination of the first two embodiments. The shell 12b may be most easily fabricated in two parts which are joined by screw means 98. An end plate 28b is provided at each end to facilitate assembly.

The output shaft 32b is journaled within the aperture 36b in each of the end plates 28b. At the right end, as viewed in the drawings, a shoulder 40b is provided on the shaft 32b for cooperation with the end plate 28b to prevent movement of the shaft 32b in a direction to the right, as viewed in the drawings. At the opposite end, a second shoulder 38b is provided on a shaft and this second shoulder 38b is spaced from the end plate. Interposed between shoulder 38b and the end plate 28b and encircling output shaft 32b is a helical compression spring 100. Compression spring 100 normally urges shoulder 40b into engagement with the adjacent end plate 28b under normal conditions. Further uses of this floating shaft will be set forth hereinafter. To complete the flux passage in the shell 12b there is provided at one end a flange 14b which wraps around the coil 16b in the fashion of the other embodiments. At the opposite end of the shell, a second flange 102 is provided and it also is reversely bent down around the coil 16b into juxtaposition to the adjacent armature. Both flanges 14b and 102 respectively are undercut as at 104 to provide a shoulder. Each of the armatures has a flange 105 which extends laterally at its outer extremity to provide a shoulder for cooperation with the shoulder formed by undercut 104, this cooperation of parts serving as a stop means for inward movement of both of the armatures. As in the other embodiment, the armatures are provided with a through bore coaxial to shaft 32b and adapted to accept within said bores tubular members 48b and 106, each having at its inner end crown cam surfaces 58b and 108 respectively.

The shaft 32b has mounted on it two pairs of rollers designated 54b and 107 respectively for right and left rollers, one pair of rollers cooperating with each of respective cam surfaces. It will be noted that the roller 54b at the right hand portion of the drawing and in contact with cam surface 58b is normally positioned adjacent to the steep rise in cam surface. On the other hand, the roller 107 in contact with cam 108 is normally spaced from the steep cam surface, on a portion of the cam having zero cam angle, a distance equal to the air gap between the cooperating shoulders formed by undercut 104 and flange 105 respectively. The purpose of this spacing of rollers in relation to cam surfaces will more clearly be set forth hereinbelow.

At a plurality of positions and circumferentially spaced about the inner opposed faces of the armatures 42b, there are located a plurality of bores in opposing registry adapted to accept a similar number of helical compression springs 110. The springs 110 normally maintain the armatures 42b in spaced apart relation with their outer ends abutting the end plates 28b. To insure the proper air gap between this double armature arrangement, a thin shim or spacer of non-magnetic material 44b, is positioned on one or more of the ends of the opposing faces of the armatures. In the operation of this device, let us first look at FIG. 7 which illustrates the attitude of the various components when the solenoid is subjected to an acceleration and gravitational force in the direction of the arrow "y." The right hand armature 42b and the shaft 32b remain in their initial positions with their respective shoulders and end faces bucked up against the journal and surface of end plate 28b. The left hand armature, because of its mass, attempts to move to the right. It thus closes up the air gap between its outer flange and shoulder 104. As was previously explained, the left hand roller 107 is initially positioned at a zero cam angle on cam surface 108 a distance from the positive cam angle equal to the air gap between the outer flange and shoulder 104. Thus, when the left hand armature 42b moves to the right, it is stopped by its outer flange and shoulder 104 and its positive cam angle is unable to take effect on roller 107 since the right hand movement has already been stopped prior to the contact of the positive cam angle and the roller 107.

Figure 8:
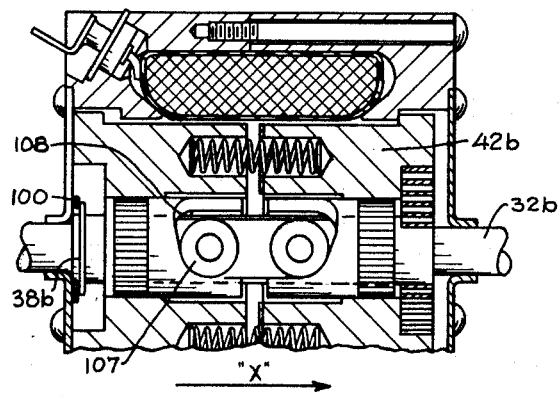

Referring now to FIG. 8, wherein the attitude of the components are disclosed in the positions they will assume when the solenoid is subjected to acceleration forces in the direction of the arrow "x." The right hand armature 42b moves to the left and the shaft 32b also moves to the left. Shoulder 38b on the shaft compresses the helical spring 100 permitting shaft 32b to float an amount equal to the movement of right hand armature 42b. Because of the zero cam angle initially presented to roller 107 in contact with cam surface 108, the left hand armature has no rotational effect on shaft 32b and because the shaft 32b and right hand armature 42b are both floating to the left the same distance, the latter armature has no effect rotationally on the shaft 32b.

Figure 6:
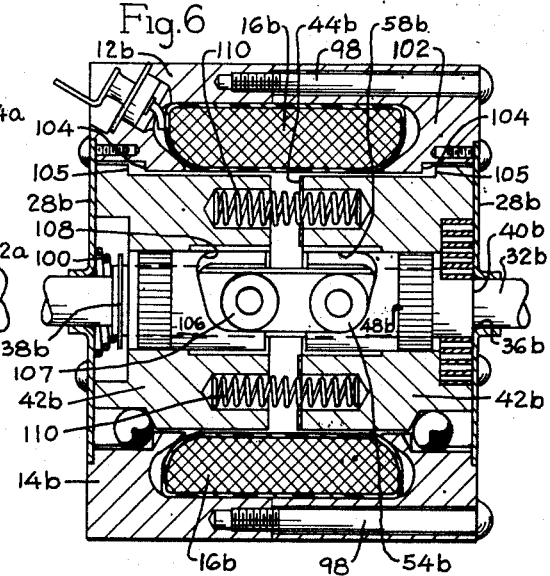
FIG. 6 is an elevation in partial section of a third embodiment of the present invention when seen in its initialled position of rest.
Figure 7:
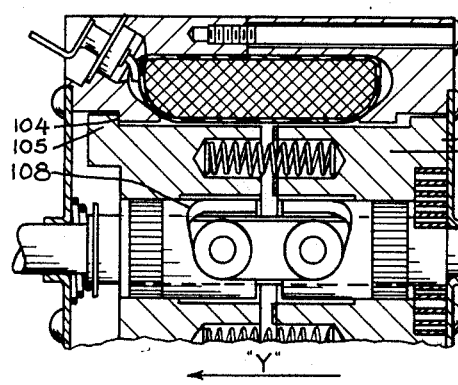
FIG. 7 is a partial sectional elevation of the embodiment shown in FIG. 6 when subjected to acceleration forces in the direction of the arrow "y" along its axis.
Figure 9:
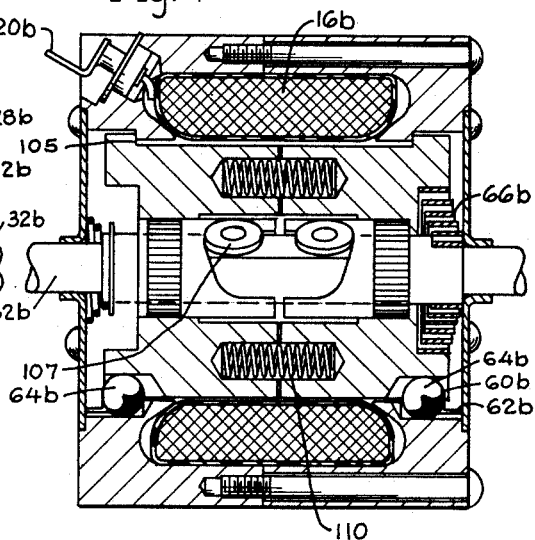
FIG. 8 is an elevation in partial section of the embodiment shown in FIG. 6 when subjected to acceleration forces along its axis in the direction of the arrow "x" and FIG. 9 is an elevation in partial section of the device shown in FIG. 6 when energized.

Referring now to FIG. 9, when voltage is applied to the coil 16b through the leads 20b, both of the armatures are moved toward the center of the solenoid against the force of the springs 110. The left hand solenoid backs up the left hand roller 107 and prevents the linear movement of the shaft to the left against spring 100 while the right hand armature and its associated cam surface 58b causes the roller to ride up the cam surface and thereby rotate the shaft 32b. As in the previous embodiments, the rotation of the armatures is prevented by the ball bearings 64b and opposed slots 60b and 62b respectively. The rotation of shaft 32b to its initial position upon de-energization is brought about by the strip spring 66b mounted in the right hand armature and on a flat at the right hand end of the shaft, in the fashion previously disclosed in the other embodiment. Similarly, upon de-energization, the springs 110 assist spring 66b in linearly returning the armatures to their initial position of rest as seen in FIG. 6. As will be appreciated, the scheduled operation of the solenoid in this embodiment can be accomplished by energizing the coil 16b when the attitude of the components is in either of the positions shown in FIG. 7 or in FIG. 8 and the device will operate properly.

From the foregoing, it can be appreciated that I have invented an improved torque or rotary solenoid which is appreciably unaffected by environmental forces of gravity or acceleration in a gravitational field. For this reason, I have adopted a short term for this and have designated these varieties of solenoids as being "anti-G" solenoids. While several embodiments incorporating this invention have been disclosed, I am certain that other embodiments of this invention will be apparent to those skilled in the art, but it is my intention that I be limited only by the appended claims.

I claim:

1. An electromagnetically operated rotary actuator comprising an electromagnet, an armature mounted for axial movement toward said electromagnet and restrained against rotary movement relative thereto, a member mounted for rotary movement relative to said armature, and rotatable means operable to impart rotary movement to said member in response to axial movement of said armature toward said electromagnet, means to prevent rotary movement of said member when said armature is subjected to external gravitational and acceleration forces but said last mentioned means being adapted to permit rotary movement during movement of said armature brought about by electromagnetic forces.

2. A device of the type claimed in claim 1 wherein said rotary actuator is provided with a second armature mounted for axial movement toward said electromagnet and the first mentioned armature and wherein said last mentioned means includes at least one compression spring acting on each of said armatures in a direction opposite to the direction of movement of the armatures towards the electromagnet and each other.

3. A device of the type claimed in claim 1 wherein said last mentioned means includes a positive detent restraining said member from rotation, said detent being movable from its restraining position upon application of an electromagnetic force, whereby said detent restrains said member except during application of an electromagnetic force to both the detent and the armature.

4. A device of the type claimed in claim 1 wherein said last mentioned means includes a non-rotatable, spring loaded axially shiftable plate having thrust bearing means supporting one end of said member whereby said member and said armature can shift axially in the same direction upon imposition of an external axial force without rendering said rotatable means operable.

5. An electromagnetically operated rotary actuator adapted to be operated in an environment adapted to be subjected to external forces of acceleration and including a coil adapted to be energized by an electric current; an armature adjacent said coil and linearly movable from a first position to a second position by the energization of said coil; magnetic circuit means substantially completing a magnetic circuit from said armature, around said coil, and back to said armature; an output shaft rotatable about its axis; means connecting said armature to said output shaft and acting to convert linear motion of said armature to rotary motion that is applied to said shaft, means for normally interrupting said magnetic circuit, magnetically conductive second means for by-passing said interrupting means, said second means being adapted to be linearly moved from a first position to a second position by the energization of said coil followed by the electromagnetic movement of said armature, and coupler means engageable between said magnetically conductive second means and said output shaft for preventing rotary motion of said shaft with the said second means in said first position interrupting the magnetic circuit, said coupler means being disengageable upon movement of said second means to said second position under influence of energization of said coil whereby to permit rotation of said output shaft.

6. A device of the type claimed in claim 5 wherein said magnetic circuit means includes a hollow core interposed internally of said coil and having a center through bore for accepting the output shaft; a magnetically conductive case surrounding the outside of the coil and extending about the armature and contacting the core at one end opposite to the first position of said armature; said means for interrupting the magnetic circuit including a plurality of bores in said one end of said core, and a plurality of non-magnetic material plugs acceptable within said bores to substantially interrupt the magnetic circuit; said second means comprising a magnetically conductive centrally apertured plate encircling said output shaft and axially movable relative to the said one end of the core and further adapted when held adjacent to the core by the energization of said coil to bridge the non-magnetic plugs and thereby complete the magnetic circuit; said coupler means including first detent means carried by said apertured plate, second detent means carried by said shaft for cooperatively engaging said first detent means carried by said plate when said plate is not in engagement with said core; and spring means normally maintaining said plate in spaced relation to said core so that said first and second detent means are cooperatively engaged and prevents rotation of said shaft relative to said core, whereby said actuator will induce rotary motion in said output shaft only when said coil is energized by an electric current and said plate is held adjacent to the core with the first detent means axially moved out of engagement with the second detent means.

7. A device of the type claimed in claim 5 wherein said magnetic circuit means includes a hollow core coaxially positioned within said coil and adapted to accept said output shaft within its through bore, a metallic case encircling said coil and engaging said core at one end of said coil and further encircling said armature at the opposite end to said core; said means for normally interrupting said magnetic circuit including non-magnetic means interposed within the end of said core so as to preclude a magnetic circuit between the core and the case; said second means inluding a plate movable axially relative to said end of the core, spring means normally maintaining said plate in engagement with the end of said core so that said plate will normally complete the magnetic circuit by bridging said non-magnetic means, said coupler means including bearing means encircling said output shaft and mounted on said plate and movable axially with said plate against said spring means away from said core upon the imposition of an external axial force, said means for converting linear motion of said armature to rotary motion also being movable with said shaft and bearings whereby said conversion means is engageable and will produce rotary motion for the output shaft only when said plate is electromagnetically retained adjacent said core.

8. An electromagnetically operated rotary actuator comprising an electromagnet, a pair of coaxial armatures mounted for axial movement toward said electromagnet as well as toward one another and restrained against rotary movement relative to said electromagnet, a member mounted for rotary movement relative to said armatures, means operable to impart rotary movement to said member in response to axial movement of said armatures towards said electromagnet, means to restrain movement of said member except during simultaneous inward movement of said armatures brought about by electromaget forces, second means to restrain movement of said armatures except movement induced by electromagnet forces.

9. A device of the type claimed in claim 8 wherein said armatures have coaxial pass-through bores, said member being a shaft passing through the bores in both of said armatures and extending therebeyond, said means operable to impart rotary movement in said shaft including two pairs of rollers mounted on spaced axes transverse to the axis of said shaft, a pair of crown cams each being integral with one of said armatures and each said cam acting on one pair respectively of said transversely mounted rollers, shoulder bearing means cooperating with one end of said shaft to restrain axial movement in one direction, spring means encircling the opposite end of said shaft and restraining the axial movement of the said shaft in the direction opposite to the restraint of the said bearing member, a plurality of compression springs interposed between and acting against said armatures.

References Cited in the file of this patent
UNITED STATES PATENTS

| | | |
|---|---|---|
| 1,015,084 | Rowe | Jan. 16, 1912 |
| 2,752,513 | Boyd | June 26, 1956 |
| 2,916,677 | Hess | Dec. 8, 1959 |
| 2,959,969 | Leland et al. | Nov. 15, 1960 |